(12) United States Patent  (10) Patent No.: US 6,195,217 B1
Park  (45) Date of Patent: Feb. 27, 2001

(54) HARD DISK EQUIPPED WITH A MEMORY FOR STORING FILE ALLOCATION TABLE (FAT) INFORMATION

(75) Inventor: Jeong Joo Park, Busan (KR)

(73) Assignee: Hyundai Electronics Industries Co., Ltd., Seoul (KR)

( * ) Notice: Subject to any disclaimer, the term of this patent is extended or adjusted under 35 U.S.C. 154(b) by 0 days.

(21) Appl. No.: 09/083,052

(22) Filed: May 22, 1998

Related U.S. Application Data

(63) Continuation-in-part of application No. 08/581,958, filed on Jan. 2, 1996, now abandoned.

(30) Foreign Application Priority Data

Mar. 6, 1995 (KR) .................................................. 95/24230

(51) Int. Cl.$^7$ ...................................................... G11B 5/09
(52) U.S. Cl. ............................ 360/48; 360/72.1; 711/100
(58) Field of Search ............................. 360/48, 58, 72.1, 360/72.2; 711/100

(56) References Cited

U.S. PATENT DOCUMENTS

| | | |
|---|---|---|
| 5,018,095 | 5/1991 | Nissimov . |
| 5,075,805 | 12/1991 | Peddle et al. . |
| 5,247,633 | 9/1993 | Nissimov . |
| 5,327,549 | 7/1994 | Nissimov . |
| 5,416,646 | 5/1995 | Shirai . |
| 5,475,668 | 12/1995 | Azumanani et al. . |
| 5,493,455 | 2/1996 | Miyoshi et al. . |
| 5,517,632 * | 5/1996 | Matsomoto et al. .................. 711/114 |
| 5,559,779 | 9/1996 | Iizuka . |
| 5,561,566 | 10/1996 | Kigami et al. . |
| 5,566,379 | 10/1996 | Mawatari et al. . |

FOREIGN PATENT DOCUMENTS

| | | |
|---|---|---|
| 0580434 A1 | 4/1994 | (EP) . |
| 6-332795 * | 12/1994 | (JP) ....................................... 360/48 |
| WO 89/10615 | 11/1989 | (WO) . |

OTHER PUBLICATIONS

Norton, *Peter Norton's Inside the PC*, Premier Edition, pp. 166–169 and pp. 203–204.
Norton, *Peter Norton's Inside the PC*, 5th Edition, pp. 180–207.
Norton, *Peter Norton's Inside the PC*, 7th Edition pp. 200–223.

* cited by examiner

Primary Examiner—Alan T. Faber
(74) Attorney, Agent, or Firm—Fleshner & Kim, LLP

(57) ABSTRACT

An improved hard disk drive is capable of storing FAT information into a FAT memory. The number of operation processes of the HDD is reduced, so that access time of the HDD can be advantageously improved. The HDD includes a head for writing data on a hard disk and for reading data from the hard disk and a file allocation table memory for storing a file allocation table information. A controller controls the movement of the head, the rotation of the hard disk drive, and a writing and reading operation of the data.

8 Claims, 2 Drawing Sheets

HARD DISK EQUIPPED WITH A MEMORY FOR STORING FILE ALLOCATION TABLE (FAT) INFORMATION

This application is a continuation-in-part of U.S. application Ser. No. 08/581,958 filed Jan. 2, 1996, now abandoned, whose entire disclosure is incorporated herein by reference.

BACKGROUND OF THE INVENTION

1. Field of the Invention

The present invention relates to a hard disk drive (HDD), and in particular to a HDD equipped with a FAT memory for storing FAT information.

2. Background of the Related Art

FIG. 1 shows a conventional HDD and computer peripheries, which includes at least one hard disk 11, which includes materials for enabling data storage, having sectors SEC0 through SEC47 divided by a sector separation line SEC and a track TRA, a head 12 for reading data from and writing data on the hard disk 11, a controller 13 for controlling the operation of the head 12 and the rotation of the hard disk 11 and the data input/output, and a buffer 14 for buffering the data outputted from the controller 13 and the data bus BUS.

A ROM 16 stores disk drive information provided by the manufacturer. The disk drive information, as is known to one of ordinary skill in the art, generally consist of number of cylinders, heads and sector per track of the hard disk 11. Such information is needed since hard disk drive format varies for each manufacturer and/or HDD model. Further, the disk drive information can be stored in the Basic Input/Output System (BIOS) ROM of a computer, as described in U.S. Pat. Nos. 5,018,095, 5,247,633 and 5,327,549 to Nissimov, whose disclosure is incorporated herein by reference.

As shown in FIG. 2, the sectors SEC0 through SEC47 includes a boot region BOOT for storing a bit record, a file allocation table (FAT) region FATS for storing information related to the location of files, a root director region RD for storing file size, file-made date and time, the address of a start cluster, and a data region DATA for storing contents of file.

Such HDD organization and concepts are known to one of ordinary skill in the art, and are explained in PETER NORTON'S INSIDE THE PC, Premier Edition, pages 166–169 and pages 203–204 and INSIDE THE PC, 5th Edition, pages 180–207, both authored by Peter Norton. In a recent republication of INSIDE THE PC, 7th Edition, 1997, pages 200–223 by Peter Norton, whose disclosure is incorporated herein by reference, the HDD organization can be based on "zones" using Logical Block Addressing (LBA) for accomplishing the same number of sectors (see page 207, Technical Note). Further, U.S. Pat. No. 5,561,566 to Kigami et al., issued Oct. 1, 1996, which is incorporated herein by reference, discloses the use of the zones. Kigami et al. discloses a ROM 32 to store the zone tables. As can be appreciated by one of ordinary skill in the art, the zone table stored in ROM 32 can vary by each manufacturer and/or HDD model. Accordingly, the zone tables and/or number of cylinders and/or head, which comprise the disk drive information, are stored in the ROM 16 of FIG. 1 if the HDD of FIG. 1 utilized zones instead of sectors. In every publication by Peter Norton, the FAT region is stored in the sectors.

The operation of the conventional HDD will now be explained with reference to the accompanying drawings.

To begin with, the controller 13 controls the writing and reading operation of the HDD 11 and the movement of the head 12, so that data stored in the hard disk 11 is read, and data is written in the hard disk 11.

That is, the above-mentioned data input/output operation is performed in accordance with the following processes:

1) The controller 13 scans the address of the start cluster from the root directory region RD by controlling the head 12 and recognizes the location of the start cluster;

2) The controller 13 scans the address of the entire cluster by moving the head 12 to the FAT region FATS; and 3) The controller 13 reads and writes the data by moving the head 12 to the data region DATA.

Here, when a desired data is not recorded in one sector, that is, the desired data is stored in a plurality of sectors, the data is increased up to 4 times.

However, since the conventional HDD is directed to scanning the FAT information recorded on the FAT region of the HDD in every time of access of the HDD while the FAT region is located at the edge portion of the HDD, an additional access step is necessary, thus increasing the access time of the HDD.

SUMMARY OF THE INVENTION

Accordingly, it is an object of the present invention to provide an HDD equipped with a FAT memory, which overcome the problems encountered in a conventional HDD.

It is another object of the present invention to provide an improved HDD equipped with a FAT memory capable of storing FAT information into a FAT memory by providing a FAT memory to HDD, thus reducing the number of operation processes of the HDD, so that access time of the HDD can be advantageously improved.

To achieve the above objects, there is provided an HDD equipped with a FAT memory, which includes a head for writing data on a hard disk drive and for reading data from the hard disk drive; a nonvolatile file allocation table memory for storing a file allocation table information; and a controller for controlling the movement of the head, the rotation of the hard disk drive, and a data writing and reading operation.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings wherein.

DETAILED DESCRIPTION OF PREFERRED EMBODIMENTS

Figure 3:
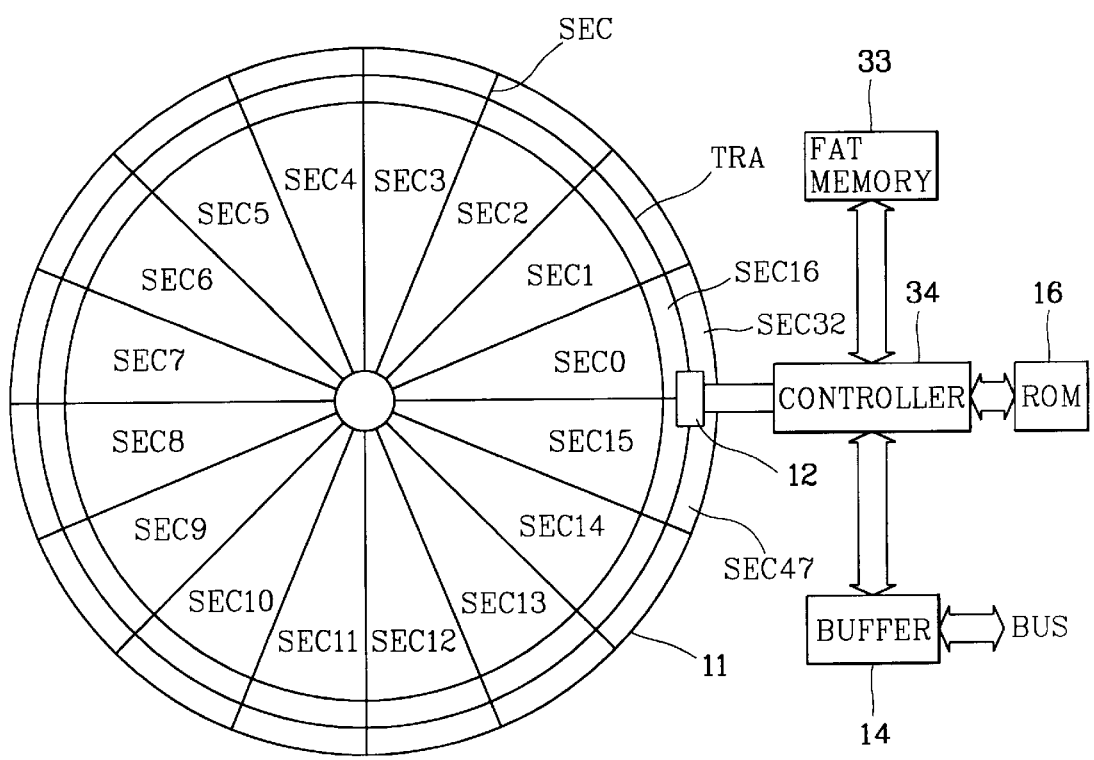
FIG. 3 is a view showing a HDD equipped with a FAT memory according to the present invention.

FIG. 3 shows an HDD equipped with a FAT memory according to a preferred embodiment of the present invention, which includes a head 32 for recording data on the hard disk 31 having a plurality of sectors SEC0 through SEC47 which are separated by sector separation lines SEC and tracks TRA for reading data from the same. A FAT memory 33 stores a FAT information. A controller 34 controls the movement of the head 32 and the rotation of the hard disk 31, and the input/output of data. The data inputted to and outputted from the controller 34 and the data bus BUS are buffered by the buffer 35. A ROM 36 stores the disk drive information such as the number of cylinders, heads and sectors per track or the zone tables, similar to the ROM 16 of FIG. 1.

Figure 4:
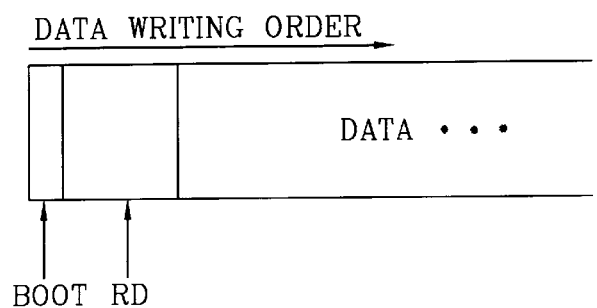
FIG. 4 is a view showing a data format of each sector of an HDD according to the present invention.

The plurality of the sectors SEC0 through SEC47, as shown in FIG. 4, include a boot region BOOT, a root director region RD, and a data region DATA, in order. Here, the sectors do not include FAT region.

The operation of the HDD equipped with a FAT memory will now be explained with reference to the accompanying drawings.

Figure 1:
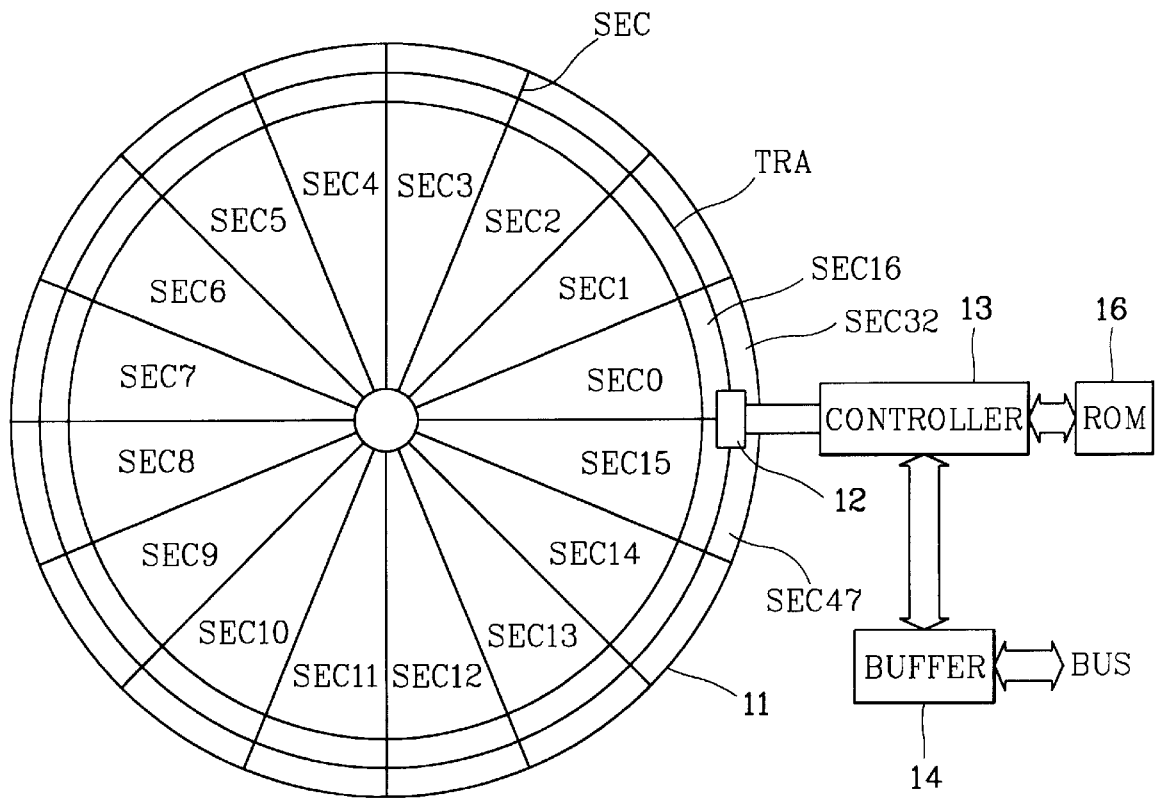
FIG. 1 is a view showing a conventional HDD and computer peripheries.
Figure 2:
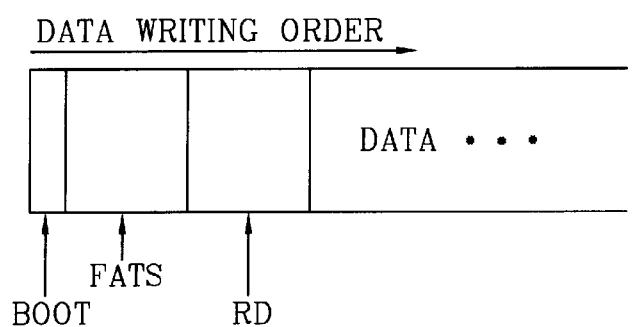
FIG. 2 is a view showing a data format of each sector of a HDD of FIG. 1.

Unlike the convention hard disk 11 of FIG. 1, as shown in FIG. 4, hard disk 31 does not include the FAT region FATS, and in this embodiment of the present invention, the FAT information is stored in the FAT memory 33 which is a nonvolatile memory device. As can be appreciated, the FAT memory 33 can be one of a SRAM with a battery, a RAM with a battery or a flash memory.

Therefore, the externally supplied data is written in the hard disk 31, and the thusly written data is read. The controller 34 moves the head 32 of the hard disk 31, and a desired sector of the hard disk 31 is searched. That is, the following processes are performed:

1) The controller 34 scans the address of a start cluster from the root director region RD by controlling the head 32, and recognizes the location of the start cluster;

2) The controller 34 fixes the head 32 and reads the FAT information stored in the FAT memory 33. At this time, the speed for recognizing the entire cluster addresses is about 50 times faster than the conventional FAT access time; and 3) The controller 34 moves the head 32 to the data region DATA and reads and writes data.

As described above, the HDD equipped with a FAT memory is directed to writing data in the FAT memory 33, thus reducing the number of HDD accesses, so that the entire HDD access time can be reduced. In addition, since the FAT information is not stored in the hard disk, the HDD storing capacity can be increased.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A disk drive, comprising:

a storage medium for storing data;

a head for writing data on said storage medium and for reading data from said storage medium;

a first memory for storing file allocation table (FAT) information; and a controller for controlling the movement of said head, the movement of said storage medium, and a data writing and reading operation, wherein said storage medium is divided into a plurality of sectors, each sector including a boot region, a root directory region, and a data region without a region for storing FAT information.

2. The disk drive of claim 1, wherein said first memory comprises a nonvolatile memory.

3. The disk drive of claim 1, wherein said first memory comprises one of a SRAM with a battery, a RAM with a battery and a flash memory.

4. The disk drive of claim 1 further comprising a second memory for storing disk drive information.

5. The disk drive of claim 4, wherein the disk drive information comprises at least one of number of cylinders, heads, sectors per track and zone tables.

6. A method of operating a hard disk drive having a disk drive with a storage medium for storing data and a file allocation table (FAT) information stored in a memory, the method comprising:

scanning a root directory region;

reading the FAT information from the memory; and accessing data on the disk drive based on FAT information of the memory, wherein the storage medium is divided into a plurality of sectors, each sector including a boot region, the root directory region, and a data region without a region for storing the FAT information.

7. A disk drive, comprising:

a storage medium for storing data;

a head for writing data on said storage medium and for reading data from said storage medium;

a first memory for storing file allocation table (FAT) information;

a second memory for storing disk drive information, which includes at least one of a number of cylinders, heads, sectors per track and zone tables; and a controller for controlling the movement of said head, the movement of said storage medium, and a data writing and reading operation.

8. A method of operating a hard disk drive having a disk drive, a first memory for storing a file allocation table (FAT) information, and a second memory for storing disk drive information, the method comprising:

scanning a root directory region;

reading the FAT information from the memory; and accessing data on the disk drive based on FAT information of the memory, wherein the disk drive information comprises one of a number of cylinders, heads, sectors per track and zone tables.

* * * * *